(12) United States Patent
Chang et al.

(10) Patent No.: US 7,373,004 B2
(45) Date of Patent: *May 13, 2008

(54) APPARATUS FOR CONSTANT QUALITY RATE CONTROL IN VIDEO COMPRESSION AND TARGET BIT ALLOCATOR THEREOF

(75) Inventors: Yung-Ching Chang, Kaohsiung (TW); Chia-Chieh Chen, Taipei (TW); Teng-Kai Wang, Taichung (TW)

(73) Assignee: Silicon Integrated Systems Corp., Hsin Chu (TW)

( * ) Notice: Subject to any disclaimer, the term of this patent is extended or adjusted under 35 U.S.C. 154(b) by 839 days.

This patent is subject to a terminal disclaimer.

(21) Appl. No.: 10/443,896

(22) Filed: May 23, 2003

(65) Prior Publication Data

US 2004/0234142 A1 Nov. 25, 2004

(51) Int. Cl.
*G06K 9/36* (2006.01)
*G06K 9/46* (2006.01)
(52) U.S. Cl. ............... 382/236; 382/238; 382/239
(58) Field of Classification Search ........... 382/236, 382/251
See application file for complete search history.

(56) References Cited

U.S. PATENT DOCUMENTS

| | | | | |
|---|---|---|---|---|
| 5,287,200 A | * | 2/1994 | Sullivan et al. | 382/251 |
| 5,301,032 A | * | 4/1994 | Hong et al. | 382/250 |
| 5,317,397 A | * | 5/1994 | Odaka et al. | 375/240.15 |
| 5,323,187 A | * | 6/1994 | Park | 375/240.04 |
| 5,404,174 A | * | 4/1995 | Sugahara | 348/700 |
| 5,802,213 A | * | 9/1998 | Gardos | 382/239 |
| 5,933,532 A | * | 8/1999 | Mihara | 382/232 |
| 5,969,764 A | * | 10/1999 | Sun et al. | 375/240.06 |
| 6,181,742 B1 | * | 1/2001 | Rajagopalan et al. | 375/240 |
| 6,188,792 B1 | * | 2/2001 | Chujoh et al. | 382/236 |
| 6,222,881 B1 | * | 4/2001 | Walker | 375/240.03 |
| 6,542,549 B1 | * | 4/2003 | Tan et al. | 375/240.26 |
| 6,678,322 B1 | * | 1/2004 | Mihara | 375/240.02 |
| 7,095,784 B2 | * | 8/2006 | Chang et al. | 375/240.03 |

* cited by examiner

*Primary Examiner*—Wenpeng Chen
*Assistant Examiner*—Yuzhen Ge
(74) *Attorney, Agent, or Firm*—Birch, Stewart, Kolasch & Birch, LLP

(57) ABSTRACT

An apparatus for constant quality rate control in moving picture compression. First, a total activity measure for the current picture to be encoded in a set of consecutive pictures is calculated. Based on the total activity measure of the current picture and an activity-to-complexity ratio of a previously encoded picture of the same type in the set of consecutive pictures, a complexity measure of the current picture is estimated. Thus, an instantaneous complexity measure is updated using the complexity measure and then an instantaneous rate is calculated. A target bit budget is allocated to the current picture depending on the instantaneous rate, the complexity measure and the instantaneous complexity measure. After encoding, the activity-to-complexity ratio for the just encoded picture is computed based on the total activity measure, actual bits consumed by the picture and the average of actual quantization step sizes used to encode the picture.

18 Claims, 5 Drawing Sheets

APPARATUS FOR CONSTANT QUALITY RATE CONTROL IN VIDEO COMPRESSION AND TARGET BIT ALLOCATOR THEREOF

BACKGROUND OF THE INVENTION

1. Field of the Invention

The invention relates to the field of data compression, and more particularly to a system capable of performing variable bit rate control for a video encoder.

2. Description of the Related Art

It is practically a cliche presently to claim that all electronic communications is engaged in a digital revolution. The main advantage of digital representation of information is the robustness of the bitstream. It can be stored and recovered, transmitted and received, processed and manipulated, all virtually without error. For example, the NTSC color video image has 29.97 frames per second, approximately 480 visible scan lines per frame and requires approximately 480 pixels per scan line in red, green, and blue color components. However, if each color component is coded using 8 bits, the bitrate produced is ≈168 Megabits per second (Mbits/s). The raw uncompressed bitrates for various video formats are very high and are not economical in many applications.

Digital audio and video signals integrated with computers, telecommunication networks, and consumer products, are poised to fuel the information revolution. At the heart of this revolution is the digital compression of audio and video signals. Several of the compression standards involve algorithms based on a common core of compression techniques, e.g., the ITU-T (formerly CCITT) Recommendation H.261 and ITU-T Recommendation H.263, and the ISO/IEC MPEG-1, MPEG-2 and MPEG-4 standards. The MPEG algorithms were developed by the Moving Picture Experts Group (MPEG), part of a joint technical committee of the International Standards Organization (ISO) and the International Electrotechnical Commission (IEC). The MPEG committee develops standards for the multiplexed, compressed representation of video and associated audio signals. The standards specify the syntax of the compressed bitstream and the method of decoding, but leave considerable latitude for novelty and variety in the algorithm employed in the encoder.

In MPEG, a sequence of video pictures is typically divided into a series of GOPs, where each GOP (Group of Pictures) begins with an Intra-coded picture (I-picture) followed by an arrangement of Forward Predictive-coded pictures (P-pictures) and Bidirectionally Predicted pictures (B-pictures). FIG. 1 illustrates a typical GOP in display order. I-pictures are coded without reference to preceding or upcoming pictures in the sequence. P-pictures are coded with respect to the temporally closest preceding I-picture or P-picture in the sequence. B-pictures are interspersed between the I-pictures and P-pictures in the sequence, and coded with respect to the immediately adjacent I- and P-pictures either preceding, upcoming, or both. Even though several B-pictures may occur in immediate succession, B-pictures may never be used to predict another picture.

Each picture has three components: luminance (Y), red color difference (Cr), and blue color difference (Cb). For an MPEG-2 4:2:0 format, the Cr and Cb components each have half as many samples as the Y component in both horizontal and vertical directions. As depicted in FIG. 2, the basic building block of an MPEG picture is the macroblock (MB). For 4:2:0 video, each MB consists of a 16×16 sample array of luminance samples together with one 8×8 block of samples for each of two color difference components. The 16×16 sample array of luminance samples is actually composed of four 8×8 blocks of samples.

It is the responsibility of an encoder to decide which picture coding type and which prediction mode is best. In an I-picture, each 8×8 block of pixels in a MB undergoes a discrete cosine transform (DCT) to form an 8×8 array of transform coefficients. The transform coefficients are then quantized with a quantizer matrix. The resulting quantized DCT coefficients are zig-zag scanned to form a sequence of DCT coefficients. The sequence of DCT coefficients is then encoded using a variable length code (VLC). In a P-picture, a decision is made to code each MB as an I macroblock, or to code the MB as a P macroblock. The I macroblock is encoded according to the technique described above. For each P macroblock, a prediction of the macroblock in a preceding picture is obtained. The prediction is identified by a motion vector indicating the translation between the macroblcok to be coded in the current picture and its prediction in the previous picture. The predictive error between the predictive macroblock and the current macroblock is then coded using the DCT, quantization, zig-zag scanning, and VLC encoding.

In the encoding of a B-picture, a decision has to be made as to the coding of each MB. There are four macroblock modes, intra (I) mode, forward (F) mode, backward (B) mode, and interpolative forward-backward (FB) mode. I mode is intracoding using no motion compensation (as in an I macroblock). F mode is unidirectional forward predictive coding using a previous picture to obtain a motion compensated prediction (as in a P macroblock). Conversely, B mode is unidirectional backward predictive coding using a subsequent picture to obtain a motion compensated prediction. In particular, FB mode is bidirectional predictive coding, wherein a motion compensated prediction is obtained by interpolating a backward motion compensated prediction and a forward motion compensated prediction. In the cases of F, B and FB macroblock modes, the predictive error is encoded using the DCT, quantization, zig-zag scanning, and VLC encoding.

The encoder must choose quantization step sizes for an entire picture so as to control visible distortion for a given bitrate. Note that the actual bits used for encoding a picture with chosen quantization step sizes are unknown until the picture is actually coded. There is no inverse function that can determine the actual used bits of a picture by simply given desired quantization step sizes. Therefore, an important aspect of any video encoder is rate control. MPEG has an important encoder restriction, namely a limitation on the variation in bits/picture, especially in the case of constant bitrate operation. This limitation is enforced through a Video Buffer Verifier (VBV). If the VBV input data rate is the same for each picture, then the video is said to be coded at Constant Bitrate (CBR). Otherwise, the video is said to be coded at Variable Bitrate (VBR). The VBV buffer is a virtual buffer and is a model of the input buffer at the decoder. The encoder allocates bits to pictures such that VBV buffer does not overflow or underflow in the case of CBR encoding. For VBR operation, the coded bitstream enters the VBV buffer at a specified maximum bitrate until the buffer is full, when no more bits are input. This translates to a bitrate entering the VBV buffer that may be effectively variable, up to the maximum bitrate. In the case of the VBR encoding, it is only necessary to prevent VBV underflow.

The intent of VBR control is to maximize the perceptual quality of the decoded pictures while maintaining the output bitrate within permitted bounds. Unlike the CBR scheme, VBR possesses more flexibility to allocate additional bits to the pictures having complex scenery and/or high motion. This latitude can be used to equalize the perceptual quality of the resulting reconstructed pictures. In some applications like digital cinema, the priority is for consistent quality from picture to picture, before any requirement for fixed bandwidth. Video encoding for such applications should use a VBR, constant quality mechanism for rate control. Nevertheless, conventional schemes for constant quality rate control are relatively complex, typically requiring multiple passes to accomplish video encoding. Accordingly, what is needed is a novel constant quality rate control technique for a single-pass, real time video encoder. It is also desirable to provide a frame-based rate control apparatus for constant quality video encoding, which is suitable for integrated circuit implementation.

SUMMARY OF THE INVENTION

In accordance with the present invention, the algorithm of target bit allocation for each picture is based on coding results of previous pictures and pre-analyzed activity of current picture to be encoded. Moreover, with the relationship between pre-analyzed activity of current picture and actual complexity of previously coded picture, the complexity of the current picture can be estimated. Since the picture's complexity measure contains quality information after coding the picture, such an estimated complexity measure of the current picture is very useful for an encoder to allocate bit budget to each picture more precisely in order to achieve uniform perceptual quality from picture to picture in a video sequence.

The present invention is generally directed to an apparatus for constant quality rate control in moving picture compression. In accordance with one aspect of the invention, the apparatus of the invention includes a motion estimation unit, a complexity estimator, a target bit allocator and a parameter updater. The motion estimation unit receives a current picture to be encoded in a set of consecutive pictures of a video sequence and calculates a total activity measure for the current picture. The complexity estimator is used to estimate a complexity measure of the current picture based on the total activity measure of the current picture and an activity-to-complexity ratio of a previously encoded picture of the same type in the set of consecutive pictures. The target bit allocator updates an instantaneous complexity measure for the set of consecutive pictures with the complexity measure of the current picture, and calculates an instantaneous rate for the set of consecutive pictures based on a predetermined reference rate, the instantaneous complexity measure and a reference complexity measure of the set of consecutive pictures. Then a target bit budget is allocated to the current picture depending on the instantaneous rate, the complexity measure and the instantaneous complexity measure. Based on the total activity measure, actual bits consumed by the current picture and an average of actual quantization step sizes used to encode the current picture, the parameter updater computes the activity-to-complexity ratio for the current picture after encoding it. Notably, the activity-to-complexity ratio of the current picture varies directly with the total activity measure of the current picture and inversely with the actual consumed bits and the average of actual quantization step sizes used to encode the current picture.

In another aspect of the invention, a target bit allocator is disclosed. The target bit allocator is comprised of an instantaneous rate calculator, a budget calculator and a clamping unit. The instantaneous rate calculator receives a complexity measure of a current picture to be encoded in a set of consecutive pictures. With the instantaneous rate calculator, an instantaneous complexity measure of the set of consecutive pictures is updated and calculated from the complexity measure of the current picture. As well, the instantaneous rate calculator computes an instantaneous rate of the set of consecutive pictures by a function of a predetermined reference rate, the instantaneous complexity measure and a reference complexity measure of the set of consecutive pictures. The budget calculator assigns a target bit budget to the current picture based on the complexity measure of the current picture, the instantaneous rate and the instantaneous complexity measure of the set of consecutive pictures. The clamping unit is provided to limit the target bit budget below a predetermined upper boundary.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and in which.

DETAILED DESCRIPTION OF THE INVENTION

Figure 1:
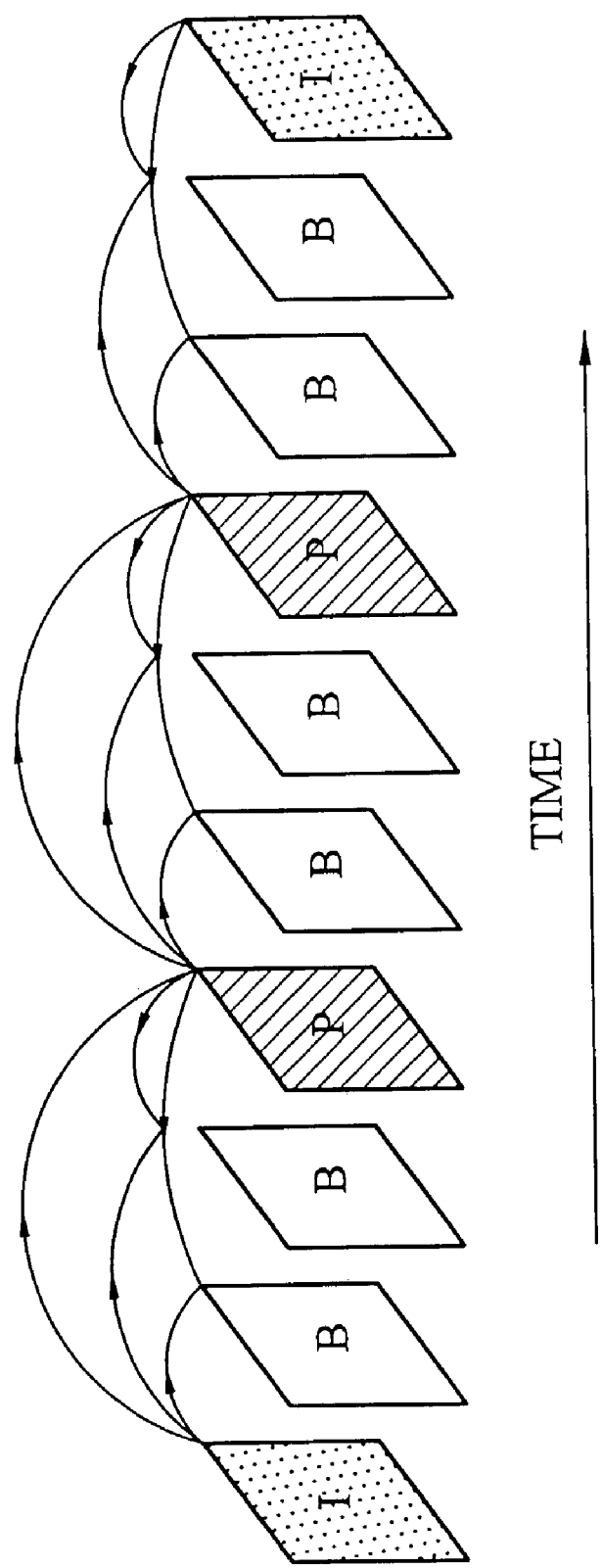
FIG. 1 shows a typical group of pictures in display order.
Figure 2:
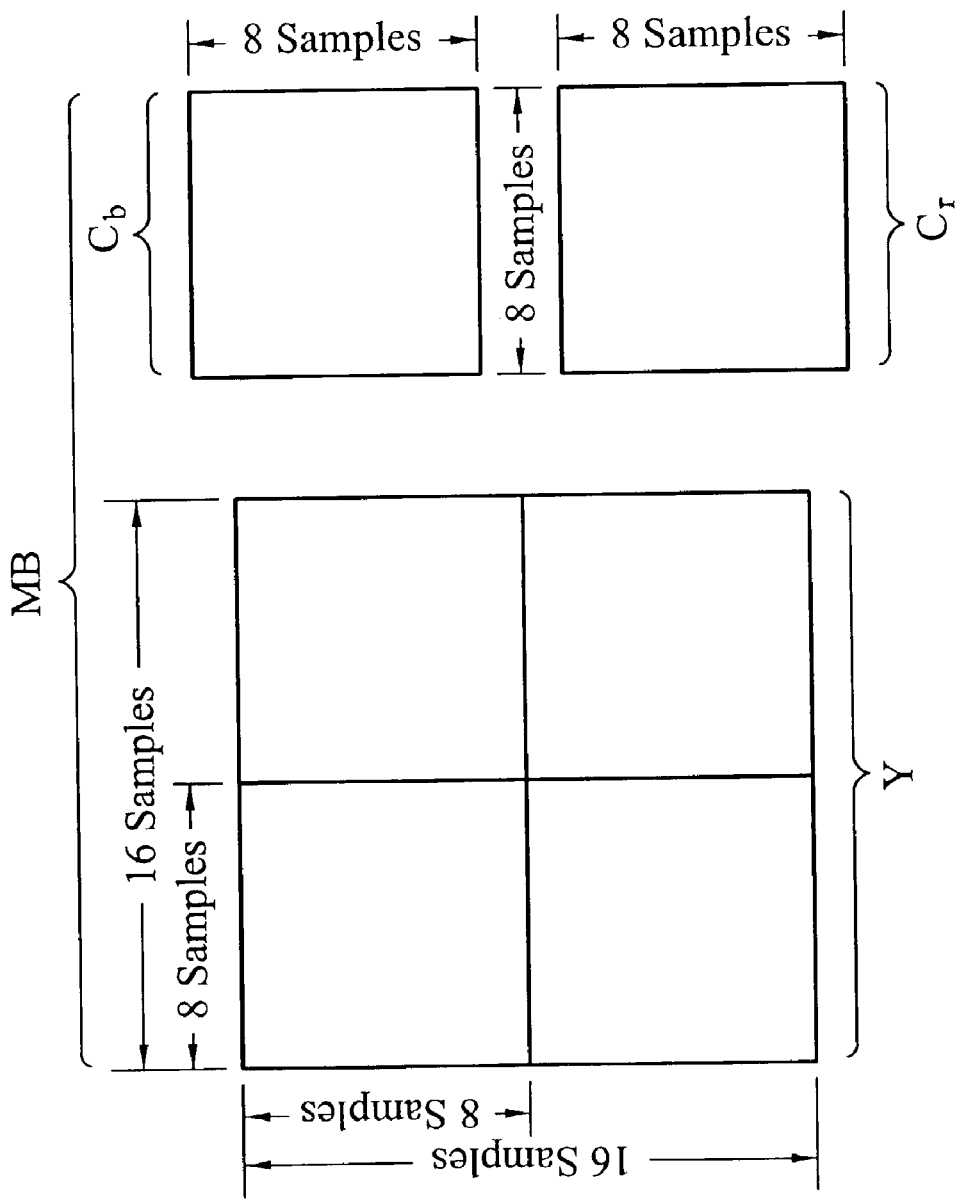
FIG. 2 shows the MPEG macroblock.

To begin with, it should be understood that I- and P-pictures used for prediction must be decoded in an MPEG encoder. With calculation of the root mean square error (RMSE) between the original picture and the decoded picture, an objective quality measure for the decoded picture is obtained. If the RMSE is the distortion measure of the decoded picture, a complexity measure C is defined for the decoded picture as follows:

$$C = r \times d$$

where r is the bitrate required to encode the picture and d is the distortion measure of the decoded picture. In theory, the relationship between average quantization step size and distortion is proportionality. Thus, the complexity measure C of the picture can be defined as:

$$C \approx \frac{r \times q}{2}$$

where q is the average quantization step size for the picture. The bitrate (actual used bits) and the average quantization step size can both be obtained after encoding a picture. Therefore, the complexity measure of this picture is also known.

Picture complexity depends on the nature of the picture itself and the coding type of the picture. Prior arts utilize the complexity measure of recently coded pictures to represent the complexity measure for the current picture and keep three complexity measures respectively for I-, P- and B-pictures to reduce the effects of different coding types. This achieves a reasonably good performance if variations in picture contents of a video sequence are smooth. However, it is not suitable for a video sequence with large content variations because there exists a mismatch between target bit allocation and actual used bits required for encoding a picture to achieve uniform perceptual quality.

With the relationship between pre-analyzed activity of current picture and actual complexity of previously coded picture, the complexity of the current picture can be estimated in accordance with the invention. The activity is an attempt to measure bitrate and quality of a picture after encoding. Assuming that a total activity measure A for an entire picture is proportional to the complexity measure C, then:

$$A = k \times C \approx \frac{k}{2} \times r \times q = k' \times r \times q$$

where k is a proportionality constant. If k' be the activity-to-complexity ratio (ACR), the total activity A can also be represented by the following equation:

$$A = ACR \times r \times q$$

According to the invention, ACR is predicted from the previously encoded picture of the same type. Conceptually, the total activity A of a picture is calculated before coding the picture. Then $C_{est}^{(i)}$, the complexity measure for a picture $P^{(i)}$ to be encoded is estimated as follows:

$$C_{est}^{(i)} = \frac{A^{(i)}}{ACR^{(i-1)}}$$

where $A^{(i)}$ is the total activity of the picture $P^{(i)}$ and $ACR^{(i-1)}$ is the activity-to-complexity ratio of the previously encoded picture of the same type. Hereinafter superscripted (i) symbols or variables indicate that the symbol or variable is associated with the current picture to be encoded. Similarly, superscripted (i−1) symbols or variables refer to the previously encoded picture of the same type.

The estimated complexity measure $C_{est}^{(i)}$ is used to update the complexity measure for the picture of the appropriate type. Note that the complexity measures of the three types of pictures $C_I$, $C_P$ and $C_B$ are stored for the following manipulations. An instantaneous complexity measure INST_C for a set of consecutive pictures is also updated as follows:

$$INST\_C = N_I \times C_I + N_P \times C_P + N_B \times C_B$$

where $N_I$, $N_P$ and $N_B$ are the numbers of I-, P- and B-pictures in the set of consecutive pictures. The set of consecutive pictures consists of at least a GOP.

In particular, pictures of types I, P, B in the same set of consecutive pictures are quantized with different step sizes to achieve constant quality from picture to picture. Therefore, the desired quantization levels for I-, P- and B-pictures are preset to $DQ_I$, $DQ_P$ and $DQ_B$, respectively. Assuming that a set of consecutive pictures is assigned a reference bitrate along with the proportion of coded bits among pictures of types I, P, B in the set of consecutive pictures, a reference complexity measure REF_C for the set of consecutive pictures is then given by:

$$REF\_C = REF\_R \cdot \frac{N_I \cdot PB_I \cdot DQ_I + N_P \cdot PB_P \cdot DQ_P + N_B \cdot PB_B \cdot DQ_B}{N_I \cdot PB_I + N_P \cdot PB_P + N_B \cdot PB_B}$$

where $PB_I$, $PB_P$ and $PB_B$ define the proportion of coded bits among pictures of types I, P, B in the set of consecutive pictures as $PB_I:PB_P:P_B$ and REF_R denotes the reference rate for the set of consecutive pictures. The proportion of coded bits among I-, P- and B-pictures may be a predefined constant or calculated from the recently encoded pictures. In light of the foregoing equation, REF_C represents a complexity measure for a set of consecutive pictures intended to be encoded with the desired quantization levels $DQ_I$, $DQ_P$ and $DQ_B$ at the reference rate REF_R. Thus, an instantaneous rate INST_R for such a set of consecutive pictures can be calculated from $$INST\_R = REF\_R \cdot \left(1 + SF \cdot \left(\frac{INST\_C}{REF\_C} - 1\right)\right)$$

where SF is a scaling factor between 0 and 1. The use of the scaling factor SF allows the instantaneous rate INST_R to vary smoothly with the instantaneous complexity measure INST_C. This results in a better distribution of bitrate among pictures. If maximum and minimum rates for the set of consecutive pictures are predetermined in accordance with the reference bitrate, the instantaneous rate INST_R is further required to limit as $ER_{min} \leq INST\_R \leq ER_{max}$.

Once the instantaneous complexity measure INST_C and the instantaneous rate INST_R have been determined, a target bit budget $TB^{(i)}$ for the current picture $P^{(i)}$ is then given by:

$$TB^{(i)} = \frac{C_{est}^{(i)}}{INST\_C} \times INST\_R$$

as such, the target bit budget $TB^{(i)}$ is proportional to the complexity measure $C_{est}^{(i)}$ and the instantaneous rate INST_R, but inversely proportional to the instantaneous complexity measure INST_C. All MPEG-2 bitstreams are required to comply with the Video Buffer Verifier (VBV) rules described in the MPEG-2 standard. The allocated target is limited such that the VBV buffer does not underflow or overflow. When the target bit budget for the current picture is determined, many different types of picture coders, such as the one described in Test Model 5 of MPEG-2, can be implemented to compress the picture according to the target bit budget.

After completing the encoding of the current picture, the actual complexity measure is known and the relationship between the total activity measure and the actual complexity measure, $ACR^{(i)}$, is calculated from $$ACR^{(i)} = \frac{A^{(i)}}{AQ^{(i)} \times UB^{(i)}}$$

in which $ACR^{(i)}$ varies directly with the total activity $A^{(i)}$, and varies inversely with the actual consumed bits $UB^{(i)}$ and the average of actual quantization step sizes used to encode the current picture, $AQ^{(i)}$. This $ACR^{(i)}$ is used to predict the complexity measure of a next picture of the same type. Note that $ACR^{(i)}$ can be linearly combined with $ACR^{(i-1)}$ to avoid the impact of a noisy picture.

Figure 3:
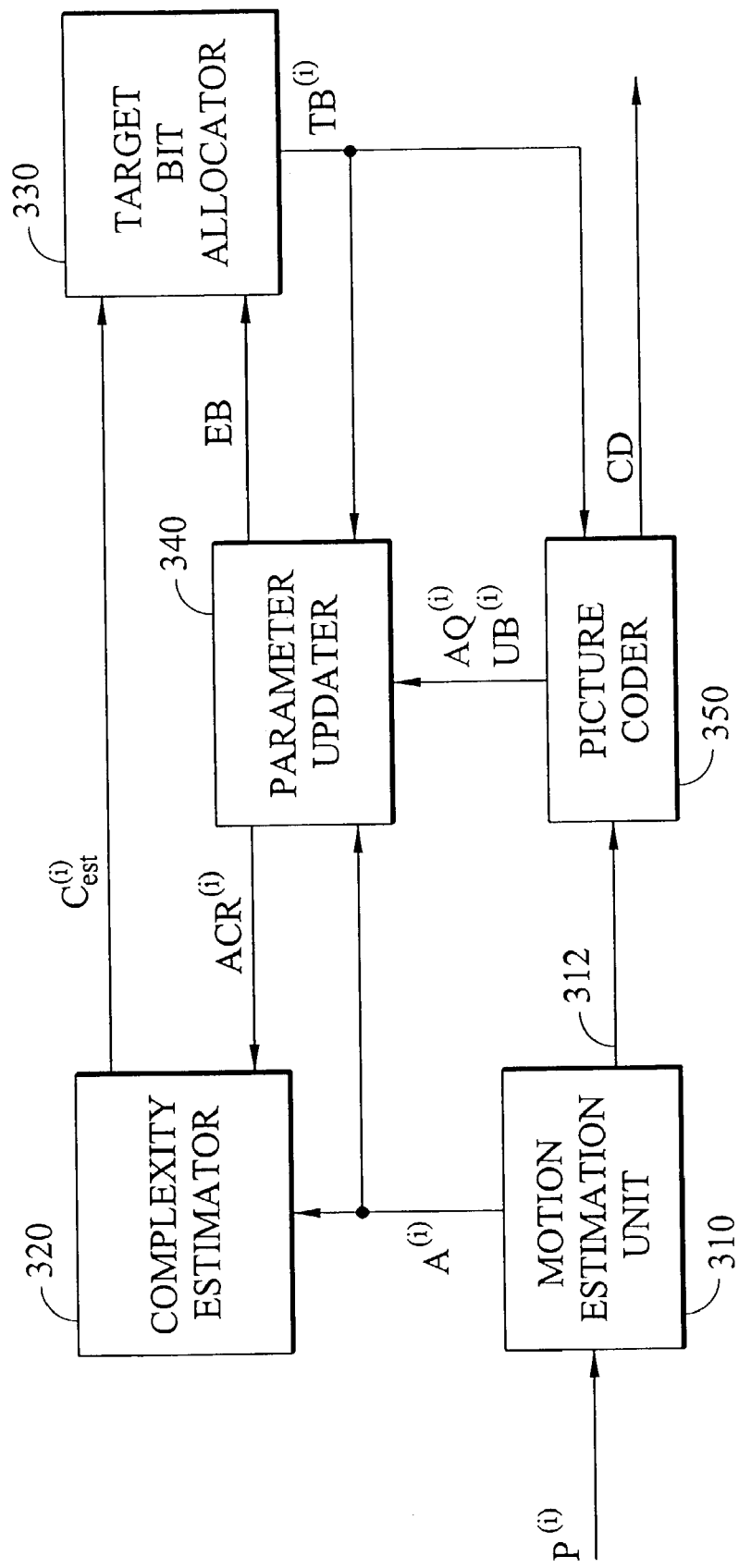
FIG. 3 is a block diagram illustrating a preferred embodiment in accordance with the invention.
Figure 4:
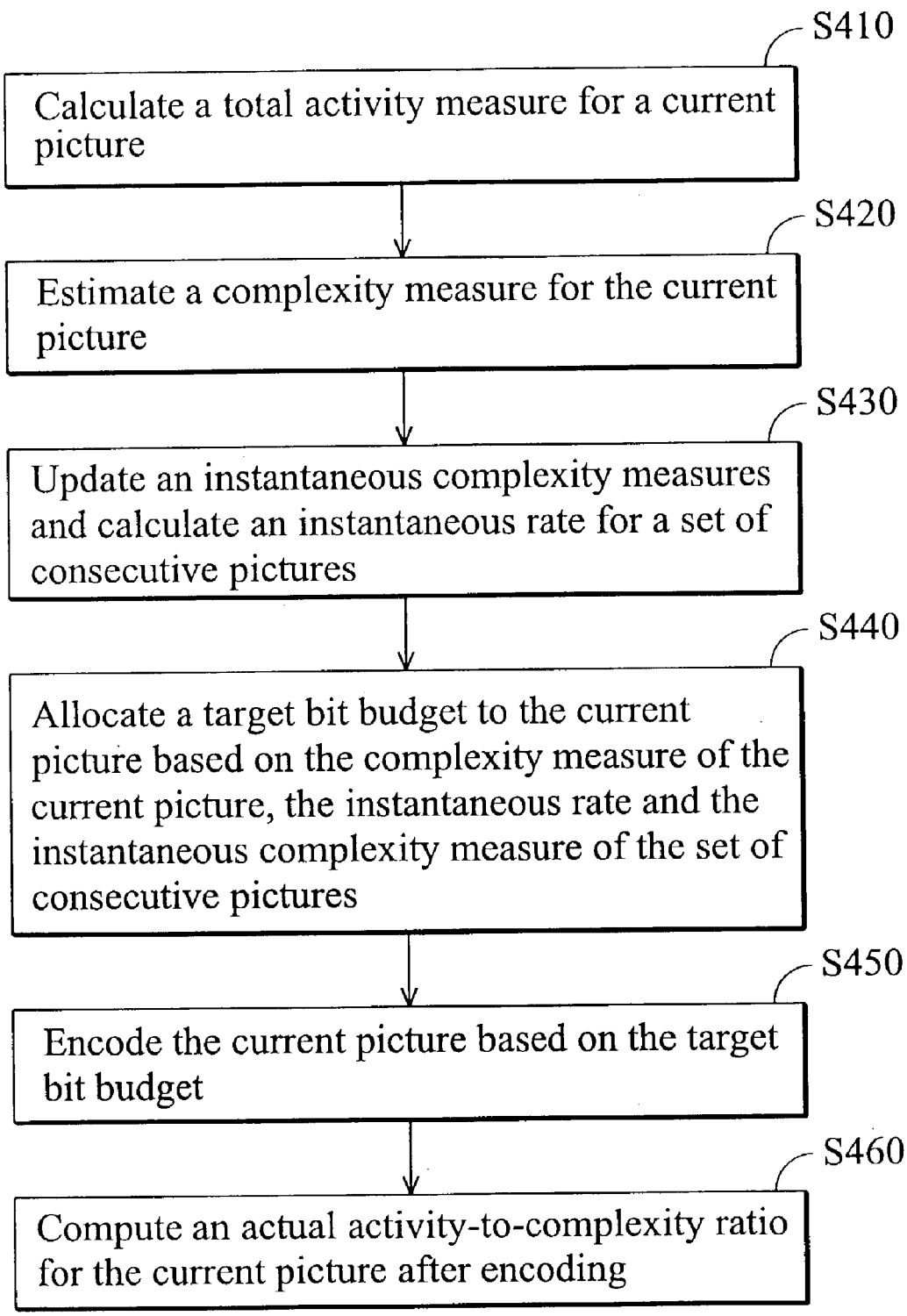
FIG. 4 is an operational flowchart in accordance with the invention.

A single-pass video encoding of the invention will be explained from a preferred embodiment of FIG. 3 in conjunction with the accompanying operational flowchart of FIG. 4. As depicted in FIG. 3, moving picture video encoder 300 includes a motion estimation unit 310, a complexity estimator 320, a target bit allocator 330, a parameter updater 340 a picture coder 350. The motion estimation unit 310 is configured to receive a picture $P^{(i)}$ in a set of consecutive pictures of a video sequence. The motion estimation unit 310 calculates a total activity measure A for the current picture $P^{(i)}$ while performing block matching for motion estimation (step S410). The complexity estimator 320 is used to estimate a complexity measure $C_{est}^{(i)}$ based on the total activity $A^{(i)}$ and an activity-to-complexity ratio $ACR^{(i-1)}$ of a previously encoded picture of the same type in the set of consecutive pictures (step S420). The target bit allocator 330 updates an instantaneous complexity measure INST_C for the set of consecutive pictures with the complexity measure $C_{est}^{(i)}$. Meanwhile, it calculates an instantaneous rate INST_R for the set of consecutive pictures based on a predetermined reference rate REF_R, the instantaneous complexity measure INST_C and a reference complexity measure REF_C (step S430).

On the basis of the instantaneous rate INST_R, the complexity measure $C_{est}^{(i)}$ and the instantaneous complexity measure INST_C, the target allocator 330 then allocates a target bit budget $TB^{(i)}$ to the current picture $P^{(i)}$ (step S440). The picture coder 350 therefore determines the quantization step sizes to be used to encode each spatial region, e.g., macroblock, of the current picture $P^{(i)}$ depending on the target bit budget $TB^{(i)}$. In accordance with the quantization step sizes, the picture coder 350 encodes the current picture $P^{(i)}$ (step 450). After encoding, it returns the average of the quantization step sizes $AQ^{(i)}$ actually used to encode the current picture $P^{(i)}$ and the actual consumed bits $UB^{(i)}$ to the parameter updater 340. Finally, based on the total activity $A^{(i)}$, the actual consumed bits $UB^{(i)}$ and the actual average quantization step size $AQ^{(i)}$, the parameter updater 340 computes the activity-to-complexity ratio, $ACR^{(i)}$, for the current picture $P^{(i)}$ (step S460).

It is contemplated that the preferred embodiment may be implemented equivalently by software and/or hardware. According to the invention, the motion estimation unit 310 and the other functional blocks of FIG. 3 may operate in a pipeline mode. The motion estimation unit 310 must finish motion estimation and total activity calculation for the current picture to be encoded before the complexity estimator 320 starts to calculate the complexity measure for the picture. Furthermore, the complexity estimator 320 and the rest of the functional blocks are still busy finishing all the operations related to the current picture while the motion estimation unit 310 prepares for the next picture. Each block of the preferred embodiment will be described in detail below.

One of the primary purposes of the motion estimation unit 310 is to determine which prediction mode will be used to code each MB in a picture, and if necessary, to carry out forward and backward motion estimation. The motion estimation unit 310 also extracts picture activity information from the block matching operation. First, the intra-activity for each MB is calculated. The pixel intensities of the four 8×8 luminance blocks in a MB are denoted by $Y_{m,n}$, m=0, ..., 7, n=0, ..., 7, and the average value of each 8×8 block by $\overline{Y}$. Then, the intra-activity IntraAct for each MB is calculated from $$IntraAct = \sum_{k=0}^{3} \sigma_k$$

where $$\sigma_k = \sqrt{\sum_{m=0}^{7}\sum_{n=0}^{7} (Y_{m,n} - \overline{Y})^2}$$

If lower computational complexity is required, the intra-activity IntraAct for each MB is taken to be the absolute difference from $\overline{Y}$ instead, and is given by:

$$IntraAct = \sum_{k=0}^{3} \Delta_k$$

where $$\Delta_k = \sum_{m=0}^{7}\sum_{n=0}^{7} |Y_{m,n} - \overline{Y}|$$

Since there is only one mode for MBs in I-pictures: I mode, the IntraAct becomes activity measure of each MB for I-pictures.

If the picture is a P-picture or B-picture, motion estimation should be performed. Block matching techniques are commonly used for finding motion vectors that are the best. For nonintra coding (P- and B-pictures), prediction with forward, backward, bidirectional, or no motion compensation can be selected by minimizing a distortion criterion such as variance or sum of absolute distortions. Once macroblock mode for each MB in a P- or B-picture has been determined, the variances of four 8×8 blocks in each motion-compensated difference MB are also obtained. Note that the motion compensated difference MB is the pixel-wise difference between the MB under consideration and the prediction MB. The sum of absolute distortions, which is usually computationally more efficient, is used in place of the variance. The variances or sums of absolute distortions of four 8×8 blocks are added to obtain the inter-activity InterAct for each MB in nonintra coded pictures. Then for each MB in the nonintra coded pictures, its InterAct is compared to its IntraAct so as to determine whether the InterAct is the smaller one. If so, the InterAct is the activity measure for that MB and the MB is coded with the inter-mode; otherwise, the IntraAct is the activity measure for that MB and the MB is coded with the intra-mode. Finally, the total activity measure $A^{(i)}$ may be obtained by summing the activity measures for all the MBs in current I-, P- or B-picture The motion estimation unit 310 sends the total activity $A^{(i)}$ to the complexity estimator 320 and the parameter updater 340.

The complexity estimator 320 then estimates the complexity measure for the current picture $P^{(i)}$ of a particular type. Moreover, weighting factors are introduced into the complexity measure $C_{est}^{(i)}$ depending on the three picture types. Because B-pictures may never be used to predict another, the weighting factor for B-picture is reduced, thereby allocating fewer bits to B-pictures and reserving bits for I- and P-pictures. Typically, the coding of I-pictures results in the most bits, so the weighting factor for P-picture is smaller than that of I-picture. Depending on the type of the current picture, the complexity measure of the current picture P is given by:

if (I-picture)
$$C_{est}^{(i)} = K_I \times \frac{A^{(i)}}{ACR_I^{(i-1)}}$$

else if (P-picture)
$$C_{est}^{(i)} = K_P \times \frac{A^{(k)}}{ACR_P^{(i-1)}}$$

else if (B-picture)
$$C_{est}^{(i)} = K_B \times \frac{A^{(i)}}{ACR_B^{(i-1)}}$$

where $ACR_I^{(i-1)}$, $ACR_P^{(i-1)}$ and $ACR_B^{(i-1)}$ denote the activity-to-complexity ratios for previously encoded pictures of types I, P and B in a set of consecutive pictures, respectively. These $ACR_I^{(i-1)}$, $ACR_P^{(i-1)}$ and $ACR_B^{(i-1)}$ are stored in the parameter updater 340, and the activity-to-complexity ratio for the previous picture of the appropriate type is read by the complexity estimator 320. The $K_I$, $K_P$ and $K_B$ are weighting factors for I-, P- and B-pictures respectively, typically ranging from 0 to 1.0. In the case of I-pictures, a value of $K_I=1.0$ may be used in the preferred embodiment.

Figure 5:
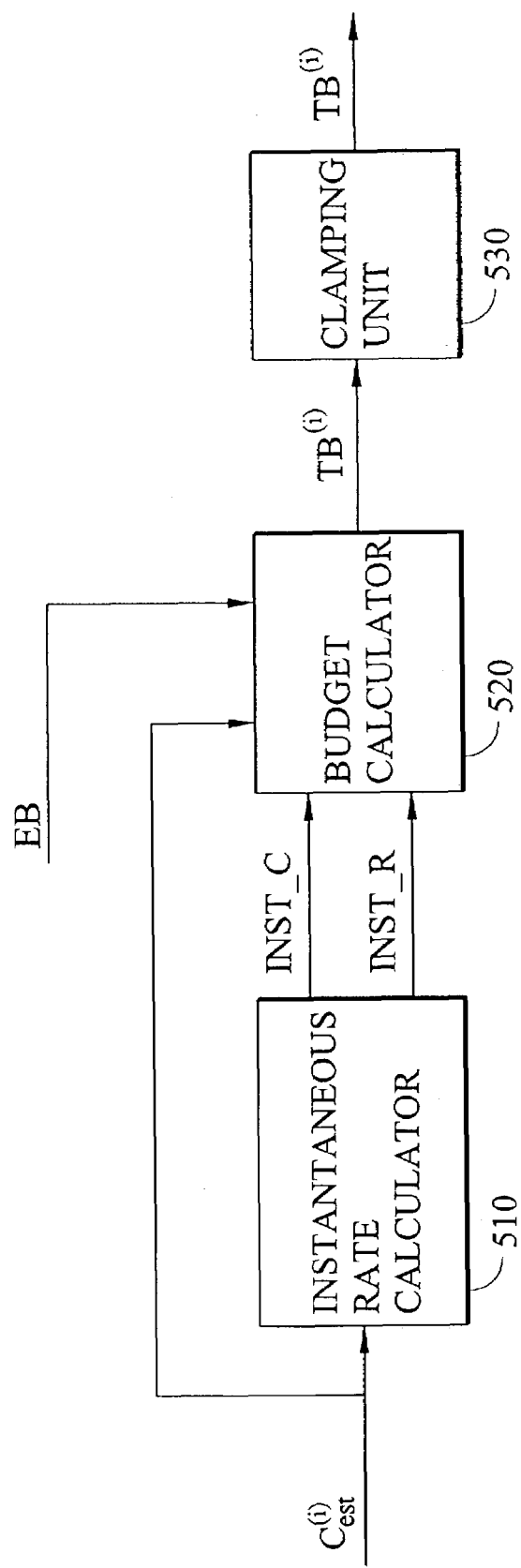
FIG. 5 is a block diagram illustrating a target bit allocator of FIG. 3.

The target bit allocator 330 may store the complexity measures $C_I$, $C_P$, $C_B$ for pictures of types I, P, B in the set of consecutive pictures, respectively. Upon receipt of the $C_{est}^{(i)}$, only one of the three complexity measures $C_I$, $C_P$ or $C_B$ is updated at a time depending on the current picture type by:
if (I-picture)
$C_I = C_{est}^{(i)}$
else if (P-picture)
$C_P = C_{est}^{(i)}$
else if (B-picture)
$C_B = C_{est}^{(i)}$ In the preferred embodiment, the target bit allocator 330 is constructed of an instantaneous rate calculator 510, a budget calculator 520 and a clamping unit 530 as shown in FIG. 5. The instantaneous rate calculator 510 updates the instantaneous complexity measure INST_C for the set of consecutive pictures as follows:

$$INST\_C = N_I \times C_I + N_P \times C_P + N_B \times C_B$$

where $N_I$, $N_P$ and $N_B$ are the numbers of I-, P- and B-pictures in the set of consecutive pictures. Apart from $C_I$, $C_P$ and $C_B$, there are five predetermined parameters stored in the instantaneous rate calculator 510. The parameters are the reference rate REF_R, the maximum rate $ER_{max}$, the minimum rates $ER_{min}$ and the reference complexity measure REF_C for the set of consecutive pictures, as well as the scaling factor SF. Nevertheless, the proportion of coded bits among pictures of types I, P, B in the set of consecutive pictures may be calculated from the recently encoded pictures and the reference complexity measure REF_C obtained accordingly. Hence:

$$REF\_C = REF\_R \cdot \frac{N_I \cdot PB_I \cdot DQ_I + N_P \cdot PB_P \cdot DQ_P + N_B \cdot PB_B \cdot DQ_B}{N_I \cdot PB_I + N_P \cdot PB_P + N_B \cdot PB_B}$$

where $PB_I$, $PB_P$ and $PB_B$ define the proportion of coded bits among pictures of types I, P, B in the set of consecutive pictures as $PB_I:PB_P:PB_B$, and $DQ_I$, $DQ_P$ and $DQ_B$ are desired quantization levels for pictures of types I, P, B in the set of consecutive pictures, respectively. Having determined the instantaneous and the reference complexity measures, the instantaneous rate calculator 510 computes the instantaneous rate INST_R for the set of consecutive pictures using the equation:

$$INST\_R = REF\_R \cdot \left(1 + SF \cdot \left(\frac{INST\_C}{REF\_C} - 1\right)\right)$$

where the scaling factor SF is set between 0 and 1 (for example 0.8). Preferably, the instantaneous rate INST_R is clamped within the predetermined maximum and minimum rates $ER_{max}$, $ER_{min}$ of the set of consecutive pictures.

Thereafter, the budget calculator 520 allocates the target bit budget $TB^{(i)}$ to the picture $P^{(i)}$. Hence, the target bit budget $TB^{(i)}$ for the current picture $P^{(i)}$ is given by:

$$TB^{(i)} = \frac{C_{est}^{(i)}}{INST\_C} \times INST\_R$$

However, the actual consumed bits will not exactly match expected bit budget. A feedback strategy has been developed to keep the actual bit consumed by the picture close to the target bit allocation. In the preferred embodiment, the current picture being coded amortizes a portion of excess bits encoded so far. Then, $$TB^{(i)} = TB^{(i)} - AR \times EB$$

where EB represents the excess bits passed from the parameter updater 340 and AR is a predefined amortization rate, typically ranging from 0.05 to 0.2. In this regard, the target bit budget $TB^{(i)}$ varies directly with the complexity measure $C_{est}^{(i)}$ and the instantaneous rate INST_R, and varies inversely with the instantaneous complexity measure INST_C. To conform to the Video Buffer Verifier (VBV), the clamping unit 530 is provided to adjust the target bit budget $TB^{(i)}$. Therefore, upper (U_bound) and lower (L_bound) boundaries on the budget are determined in advance. The target bit budget must be allocated to a picture such that the VBV buffer does not overflow or underflow in the case of constant bitrate (CBR) operation. The clamping unit 530 limits the target bit budget $TB^{(i)}$ to lie within the boundaries:

if ($TB^{(i)}$>U_bound) then $TB^{(i)}$=U_bound if ($TB^{(i)}$<L_bound) then $TB^{(i)}$=L_bound For variable bitrate (VBR) operation, it is only necessary to prevent VBV underflow:

if ($TB^{(i)}$>U_bound) then $TB^{(i)}$=U_bound

Then the target bit budget $TB^{(i)}$ is fed to the parameter updater 340 and the picture coder 350.

Turning back to FIG. 3, the picture coder 350 receives the picture data and the macroblock mode and motion vectors for each MB from the motion estimation unit 310 through line 312. To optimize the picture quality, the picture coder 350 determines quantization step sizes to be used to encode each MB of the current picture $P^{(i)}$ depending on the target bit budget $TB^{(i)}$. Based on this data, the picture coder 350 starts to encode the picture $P^{(i)}$ and outputs coded data CD. Finally, taking the average of the quantization step sizes and calculating the actual consumed bits $UB^{(i)}$ after encoding the picture $P^{(i)}$, the picture coder 350 reports the $UB^{(i)}$ and the average quantization step size $AQ^{(i)}$ of the current picture to the parameter updater 340.

After encoding the picture $P^{(i)}$, the parameter updater 340 accumulates the mismatch between the target bit budget $TB^{(i)}$ and the actual consumed bits $UB^{(i)}$ for the picture $P^{(i)}$ to yield the excess bits EB as:

$$EB=EB\times(1-AR)+UB^{(i)}-TB^{(i)}$$

where AR is the predefined amortization rate. The relationship between the total activity measure $A^{(i)}$ and the actual complexity measure, $ACR^{(i)}$, is obtained by $$ACR^{(i)} = \frac{A^{(i)}}{AQ^{(i)} \times UB^{(i)}}$$

The ACR of the just encoded picture $P^{(i)}$, in turn, is used to predict the complexity measure for a next picture of the same type. To protect the $ACR^{(i)}$ from the effects of a noisy picture, linear combination of the $ACR^{(i)}$ and $ACR^{(i-1)}$ may be utilized in the preferred embodiment. For instance:

if (I-picture)

$ACR_I^{(i)}=ACR_I^{(i-1)}\times(1-CW)+ACR^{(i)}\times CW$ else if (P-picture)

$ACR_P^{(i)}=ACR_P^{(i-1)}\times(1-CW)+ACR^{(i)}\times CW$ else if (B-picture)

$ACR_B^{(i)}=ACR_B^{(i-1)}\times(1-CW)+ACR^{(i)}\times CW$ where CW is the predefined weighting factor for the linear combination. The updated $ACR_I^{(i)}$, $ACR_P^{(i)}$ or $ACR_B^{(i)}$ are sent to the complexity estimator 320 so as to estimate the complexity measure for next picture of the appropriate type. Additionally, the excess bits EB is fed to the target bit allocator 330 for bit allocation.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus for constant quality rate control in moving picture compression, comprising:

a motion estimation unit receiving a current picture to be encoded in a set of consecutive pictures of a video sequence, for calculating a total activity measure for the current picture to be encoded;

a complexity estimator for estimating a complexity measure of the current picture based on the total activity measure of the current picture and an activity-to-complexity ratio of a previously encoded picture of the same type in the set of consecutive pictures;

a target bit allocator updating an instantaneous complexity measure for the set of consecutive pictures with the complexity measure of the current picture, and calculating an instantaneous rate of the set of consecutive pictures based on a predetermined reference rate, the instantaneous complexity measure and a reference complexity measure of the set of consecutive pictures, for allocating a target bit budget to the current picture depending on the complexity measure of the current picture, the instantaneous rate and the instantaneous complexity measure of the set of consecutive pictures; and a parameter updater for computing the activity-to-complexity ratio for the current picture based on the total activity measure, actual bits consumed by the current picture and an average of actual quantization step sizes used to encode the current picture, and calculating the reference complexity measure for the set of consecutive pictures based on the complexity measure of the current picture;

wherein the activity-to-complexity ratio of the current picture varies directly with the total activity measure of the current picture and inversely with the actual consumed bits and the average of actual quantization step sizes used to encode the current picture.

2. The apparatus as recited in claim 1 further comprising a picture coder determining the quantization step sizes to be used to encode each spatial region of the current picture in accordance with the target bit budget for the current picture, for encoding the current picture using the quantization step sizes, and returning the actual consumed bits of the current picture and the average of the quantization step sizes to the parameter updater.

3. The apparatus as recited in claim 2, wherein the parameter updater computes the activity-to-complexity ratio for the current picture by:

$$ACR = \frac{A}{AQ \times UB}$$

where ACR denotes the activity-to-complexity ratio of the current picture, A is the total activity measure of the current picture, AQ is the average of actual quantization step sizes used to encode the current picture, and UB represents the actual bits consumed by the current picture.

4. The apparatus as recited in claim 1, wherein the complexity estimator obtains the complexity measure of the current picture by:

$$C_{est} = K \times \frac{A}{ACR}$$

where $C_{est}$ is the complexity measure of the current picture, K is a predefined weighting factor ranging from 0~1.0, A is the total activity measure of the current picture in the set of consecutive pictures, and ACR is the activity-to-complexily ratio of the previously encoded picture of the same type in the set of consecutive pictures.

5. The apparatus as recited in claim 1, wherein the target bit allocator stores estimated complexity measures $C_I$, $C_P$, $C_B$ for pictures of types I, P, B in the set of consecutive pictures, respectively, and takes the complexity measure of the current picture to update the estimated complexity measure for the picture of the same type.

6. The apparatus as recited in claim 5, wherein the target bit allocator comprises;
   an instantaneous rate calculator for updating the instantaneous complexity measure of the set of consecutive pictures based on the complexity measure of the current picture, and computing the instantaneous rate of the set of consecutive pictures based on a function of the predetermined reference rate, the instantaneous complexity measure and the reference complexity measure of the set of consecutive pictures;
   a budget calculator for assigning the target bit budget to the current picture based on the complexity measure of the current picture, the instantaneous rate and the instantaneous complexity measure of the set of consecutive pictures; and
   a clamping unit for limiting the target bit budget below a predetermined upper boundary.

7. The apparatus as recited in claim 6, wherein the instantaneous rate calculator obtains the instantaneous complexity measure of the set of consecutive pictures by:

$$INST\_C = N_I \times C_I + N_P + C_P + N_B \times C_B$$

where INST_C denotes the instantaneous complexity measure, and $N_I$, $N_P$, $N_B$ are the numbers of pictures of types I, P, B in the set of consecutive pictures, respectively.

8. The apparatus as recited in claim 6, wherein the budget calculator allocates the current picture the target bit budget varying directly with the complexity measure of the current picture and the instantaneous rate of the set of consecutive pictures, and varying inversely with the instantaneous complexity measure of the set of consecutive pictures.

9. The apparatus as recited in claim 6, wherein the clamping unit further limits the target bit budget above a predetermined lower boundary.

10. The apparatus as recited claim 1, wherein the set of consecutive pictures comprises at least a group of pictures (GOP) compliant with the MPEG video standards.

11. An apparatus for constant quality rate control in moving picture compression, comprising:
   a motion estimation unit receiving a current picture to be encoded in a set of consecutive pictures or a video sequence, for calculating a total activity measure for the current picture to be encoded;
   a complexity estimator for estimating a complexity measure of the current picture based on the total activity measure of the current picture and an activity-to-complexity ratio of a previously encoded picture of the same type in the set of consecutive pictures;
   a target bit allocator comprising:
   an instantaneous rate calculator for updating the instantaneous complexity measure of the set of consecutive pictures based on the complexity measure of the current picture, and computing the instantaneous rate of the set of consecutive pictures based on a function of the predetermined reference rate, the instantaneous complexity measure and the reference complexity measure of the set of consecutive pictures, wherein the instantaneous rate of the set of consecutive pictures is computed from $$INST\_R = REF\_R \cdot \left(1 + SF \cdot \left(\frac{INST\_C}{REF\_C} - 1\right)\right)$$

where REF_R is the predetermined reference rate for the set of consecutive pictures, SF is a sealing factor between 0 and 1, INST_C an L REF_C are the instantaneous and the reference complexity measures of the set of consecutive pictures, respectively, and INST_R denotes the instantaneous rate;
   a budget calculator for assigning the target bit budget to the current picture based on the complexity measure of the current picture, the instantaneous rate and the instantaneous complexity measure of the set of consecutive pictures; and
   a clamping unit for limiting the target bit budget below a predetermined upper boundary;
   wherein the target bit allocator stores estimated complexity measures $C_I$, $C_P$, $C_B$ for pictures of types I, P, B in the set of consecutive pictures, respectively, and takes the complexity measure of the current picture to update the estimated complexity measure for the picture of the same type; and
   a parameter updater for computing the activity-to-complexity ratio for the current picture based on the total activity measure, actual bits consumed by the current picture and an average of actual quantization step sizes used to encode the current picture, and calculating the statistical complexity measure for the set of consecutive pictures based on the complexity measure of the current picture;
   wherein the activity-to-complexity ratio of the current picture varies directly with the total activity measure of the current picture and inversely with the actual consumed bits and the average of actual quantization step sizes used t, encode the current picture.

12. The apparatus as recited in claim 11, wherein the instantaneous rate of the set of consecutive pictures is clamped within a predetermined maximum rate and minimum rate for the set of consecutive pictures.

13. The apparatus as recited in claim 11, wherein the reference complexity measure of to set of consecutive pictures is given by:

$$REF\_C = REF\_R \cdot \frac{N_I \cdot PB_I \cdot DQ_I + N_P \cdot PB_P \cdot DQ_P + N_B \cdot PB_B \cdot DQ_B}{N_I \cdot PB_I + N_P \cdot PB_P + N_B \cdot PB_B}$$

where PBI, PBP and PBB define the proportion of coded bits among pictures of types I, P, B in the set of consecutive pictures as PBI:PBP:PBB, DQI, DQP and DQB are desired quantization levels for pictures of types I, P, B in the set of consecutive pictures, respectively, and NI, NP, NB are the numbers of pictures of types I, P, B in the set of consecutive pictures, respectively.

14. The apparatus as recited in claim 11, wherein the reference complexity measure of the set of consecutive pictures is a predetermined constant.

15. A target bit allocator comprising:

an instantaneous rate calculator receiving a complexity measure of a current picture to be encoded in a sex of consecutive pictures, for updating an instantaneous complexity measure of the set of consecutive pictures based on the complexity measure of the current picture, and computing an instantaneous rate for the set or consecutive pictures based on a function of a predetermined reference rate, the instantaneous complexity measure and a reference complexity measure of the set of consecutive pictures, wherein the instantaneous rate of the set of consecutive pictures is computed using the function as follows:

$$INST\_R = REF\_R \cdot \left(1 + SF \cdot \left(\frac{INST\_C}{REF\_C} - 1\right)\right)$$

where REF_R is the predetermined reference rate for the set of consecutive pictures, SF is a scaling factor between 0 and 1 INST_C and REF_C are the instantaneous and the reference complexity measures of the set of consecutive pictures, respectively, and INST_R denotes the instantaneous rate;

a budget calculator for assigning a target bit budget to the current picture based on the complexity measure of the current picture, the instantaneous rate and the instantaneous complexity measure of the set of consecutive pictures; and a clamping unit for limiting the target bit budget below a predetermined upper boundary.

16. The apparatus as recited in claim 15, wherein the budget calculator allocates the current picture the target bit budget varying directly with the complexity measure of the current picture and the instantaneous rate of the set of consecutive pictures, and varying inversely with the instantaneous complexity measure of the set of consecutive pictures.

17. The apparatus as recited in claim 15, wherein the reference complexity measure of the set of consecutive pictures is given by:

$$REF\_C = REF\_R \cdot \frac{N_I \cdot PB_I \cdot DQ_I + N_P \cdot PB_P \cdot DQ_P + N_B \cdot PB_B \cdot DQ_B}{N_I \cdot PB_I + N_P \cdot PB_P + N_B \cdot PB_B}$$

where PBI, PBP and PBB define the proportion of coded bits among pictures of types I, P, B in the set of consecutive pictures as $PB_I:PB_P:PB_B$, DQI, DQP and DQB are desired quantization levels for pictures of types I, P, B in the set of consecutive pictures, respectively, and $N_I$, $N_P$, $N_B$ are the numbers of pictures types I, P, B in the set of consecutive pictures, respectively.

18. The apparatus as recited in claim 15, wherein the reference complexity measure of the set of consecutive pictures is a predetermined constant.

* * * * *